United States Patent [19]

Dearman

[11] Patent Number: 4,497,119
[45] Date of Patent: Feb. 5, 1985

[54] PIPEFITTER'S PROTRACTOR

[76] Inventor: Timothy C. Dearman, 3002 S. Main St., Pearland, Tex. 77581

[21] Appl. No.: 486,103

[22] Filed: Apr. 16, 1983

[51] Int. Cl.³ .............................................. B43L 7/06
[52] U.S. Cl. ................................. 33/464; 33/174 N; 33/427
[58] Field of Search .................... 33/174 N, 427, 464, 33/452, 478, 480, 485, 180 R, 173

[56] References Cited

U.S. PATENT DOCUMENTS

| 1,269,324 | 6/1918 | Shaver | 33/427 |
| 1,828,930 | 10/1931 | Grozi | 33/419 |
| 2,194,085 | 3/1940 | Hastings | 33/464 |
| 3,245,201 | 4/1966 | Richardson | 33/180 R |
| 3,331,134 | 7/1967 | Jackson et al. | 33/174 N X |
| 3,670,418 | 6/1972 | Hamilton | 33/174 N |
| 4,388,765 | 6/1983 | Dearman | 33/464 |

Primary Examiner—Harry N. Haroian
Attorney, Agent, or Firm—Learman & McCulloch

[57] ABSTRACT

A pipefitter's protractor has a pair of body members each of which is capable of supporting a welder's square. The body members are relatively rotatable about an axis so as to enable the squares to occupy any selected position of angular adjustment. The squares are supported on opposite sides of their respective body members to prevent interference between the squares during rotation of the body members.

7 Claims, 7 Drawing Figures

PIPEFITTER'S PROTRACTOR

BACKGROUND OF THE INVENTION

In preparing to weld two pipes to one another, or one pipe to a fitting, or a pipe to an elbow or tube turn, it often is necessary to position the two members to be welded together in such manner that their axes have a predetermined relationship with one another. In some instances the axes should be coincidental, whereas in other instances the axes may form an angle with one another. In either case, it is desirable that the relationship of the axes be verified prior to the commencement of the welding operation. This conveniently can be done by the use of one or more welder's squares or a combination of squares and straight blades. Heretofore, however, it has been difficult or awkward to support the squares and/or blades so as to enable them to be located at any selected angle to each other.

Apparatus constructed in accordance with the invention overcomes to a large extent the problems involved in orienting a combination of welder's squares and/or straight blades relatively to one another, and enables them to be located in any selected position of angular adjustment.

SUMMARY OF THE INVENTION

A pipefitter's protractor constructed in accordance with a preferred embodiment of the invention comprises a pair of body member overlying on another and coupled for relative rotation about an axis. One of the body members is adapted to accommodate and support a straight blade or one leg of a welder's square for movement with such body, and the other body is adapted to support a straight blade or one leg of another square for movement with such body. The body members are so constructed that the respective straight blades or welder's squares supported thereby are in parallel, but spaced apart overlying planes so as to enable free rotation of the two bodies about their axis without interference from the blades or squares.

One of the body members is provided with indicia graduated in degrees and arranged on an arc having its center at the axis of rotation of the body, and such indicia may be read in conjunction with a reference on the other of the bodies to indicate the angular relationship between the two bodies. A releasable latch is operable to maintain the two bodies in any one of a number of selected angular positions.

DESCRIPTION OF THE DRAWINGS

A preferred embodiment of the invention is disclosed in the following description and accompanying drawings, wherein.

DETAILED DESCRIPTION

Figure 1:
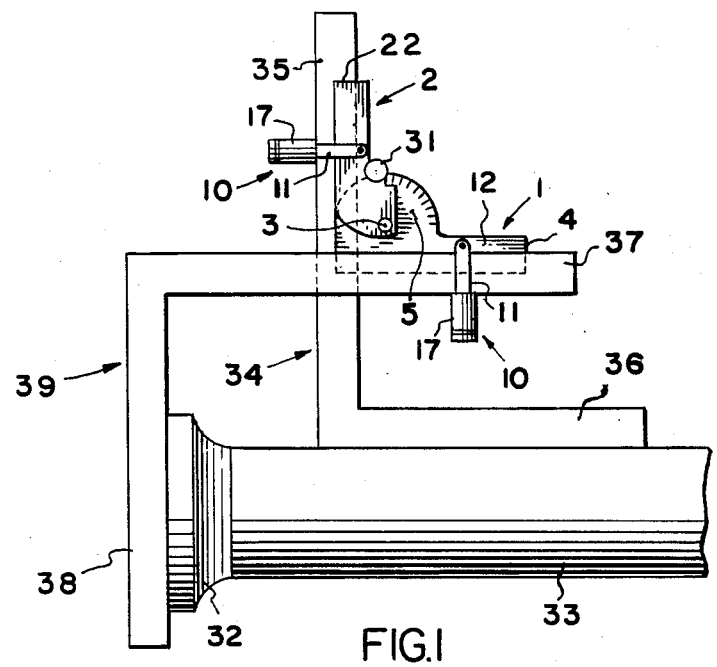
FIG. 1 is a plan view of a protractor supporting a pair of welder's squares and being used to position a fitting relative to a pipe.
Figure 2:
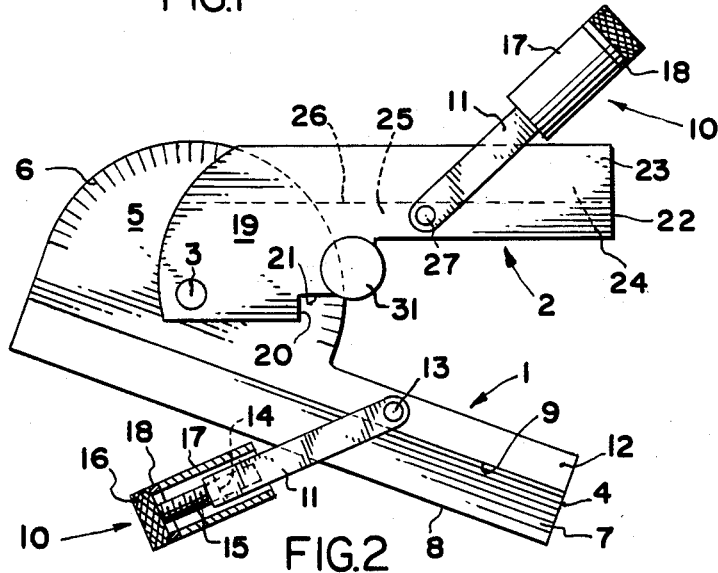
FIG. 2 is a plan view on an enlarged scale of one side of the protractor.
Figure 3:
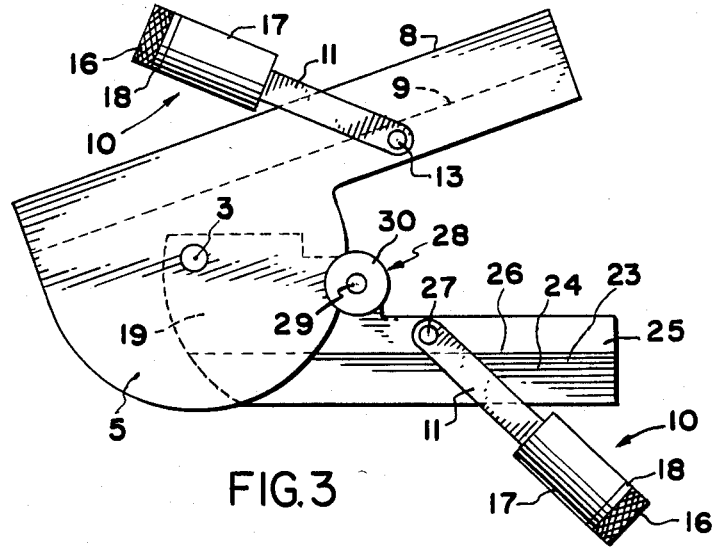
FIG. 3 is a plan view of the opposite side of the protractor.

A protractor constructed in accordance with a preferred embodiment of the invention comprises two body members 1 and 2 arranged in overlying relationship and coupled to one another for relative rotation about a transverse axis 3 defined by a pivot pin. The body 1 comprises an elongate limb 4 from one edge of which extends a flat, semi-circular projection 5. Adjacent its marginal edge the projection 5 is provided on one side thereof with indicia comprising an arcuate scale 6 graduated in degrees and formed on an arc having its center at the axis 3.

The limb 4 is reduced in thickness on one side thereof to form a ledge 7 having a free, straight edge 8. Parallel to, but spaced from the edge 8, the thicker portion of the limb 4 forms an abutment 9 which projects above the surface of the ledge 7. The opposite side of the limb 4 is flat.

Pivoted to the limb 4 is a clamp 10 having a pair of parallel legs 11 which straddle the limb 4 and are pivoted to the thicker portion 12 of the limb by a pivot pin 13. The opposite ends of the legs 11 are joined by a web 14 through which extends a threaded shaft 15 having an operating knob 16 at its outer end. A bearing sleeve 17 encircles the legs 11 and between the knob 16 and the sleeve 17 is a washer 18 that is adapted to abut the outer end of the sleeve.

The body 2 has a flat section 19 which overlies the projection 5 and has a notch 20 provided with a straight reference edge 21 which lies on a radius having its center at the axis 3. The straight edge 21 is used in conjunction with the indicia 6 to determine the relative angular positions of the members 1 and 2.

The body 2 also has an elongate limb 22 which extends beyond the section 19. The limb 22 has a relatively thin portion 23 constituting a ledge 24 and a relatively thick portion 25. At the juncture between the portions 24 and 25 is an abutment 26 which extends above the level of the ledge 24. A clamp 10 similar in all respects to the earlier described clamp is pivoted to the thicker portion 25 by a pivot pin 27.

Adjacent the notch 20 of the body 2 is mounted a releasable lock 28 comprising a threaded shaft 29 which extends through a correspondingly threaded opening in the body section 19 and has fixed at one end thereof a clamp disc 30 and at the opposite end an operating knob 31. The projection 5 of the body member 1 is sandwiched between the clamp member 30 and the body section 19 so as to enable the projection to be clamped between the disc 30 and the section 19 in response to rotation of the knob 31 in one direction, thereby disabling relative rotation of the body members 1 and 2 about the axis 3. However, rotation of the knob 31 in the opposite direction will relieve the clamping force so as to enable the members 1 and 2 to rock about the axis 3.

The apparatus thus far described is adapted for use with pipefitter's squares or straight blades, each of which has an elongate, flat body portion which may pass through the opening between the legs 11 of a clamp 10 for slideable accommodation on the ledge 7 or 24 of the member 1 or 2, respectively. When in place on one of the ledges, one edge of the square's leg or one edge of the straight blade will bear against the associated abutment 9 or 26. Preferably the thickness of the leg or blade corresponds to the height of the associated abutment. The width of the leg or blade is greater than that of the associated ledge thereby enabling the leg or blade to be fixed in place by the sleeve 17 of the associated clamp 10.

Figure 4:
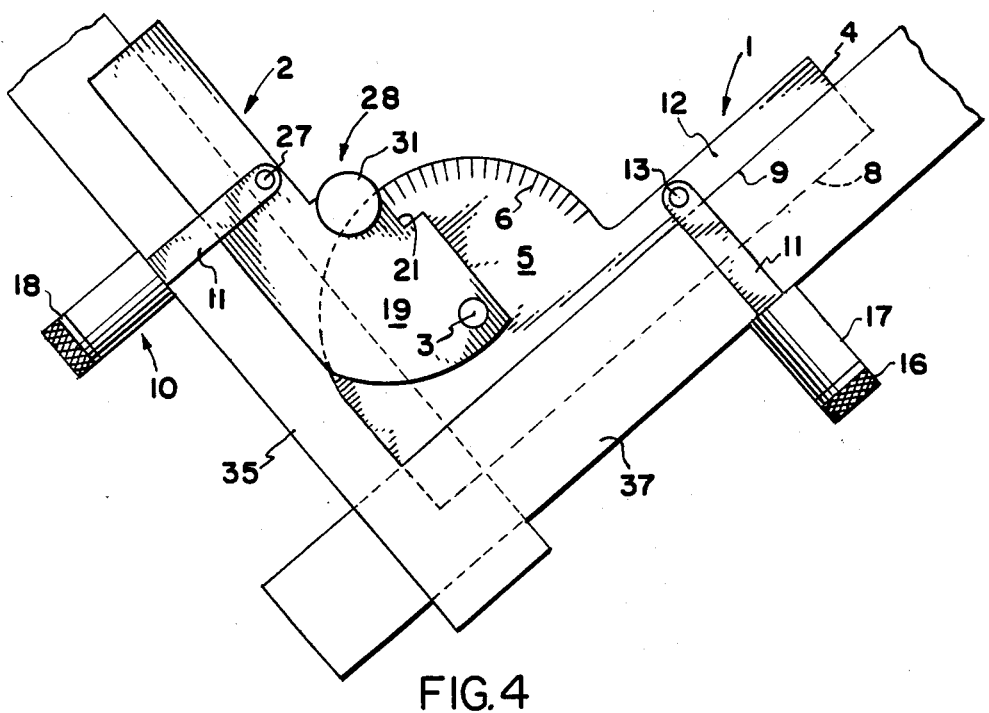
FIG. 4 is a fragmentary plan view of one side of the protractor showing the two squares supported by the protractor and arranged at 90° to one another.
Figure 5:
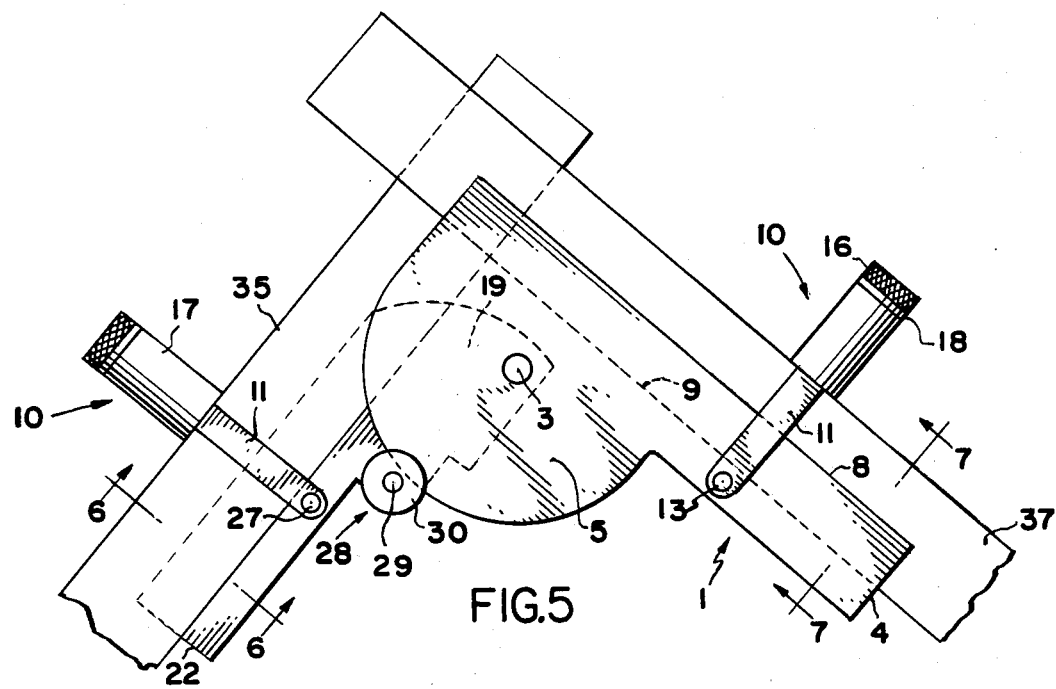
FIG. 5 is a plan view of the opposite side of the apparatus shown in FIG. 4.
Figure 6:
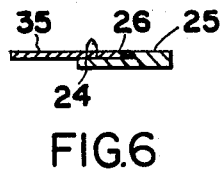
FIGS. 6 and 7 are sectional views taken on the lines 6—6 and 7—7, respectively, of FIG. 5.
Figure 7:
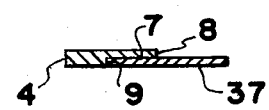

A protractor constructed according to the invention has many uses, one of which is illustrated in FIGS. 1, 4, and 5, wherein a flanged fitting 32 is positioned at one end of a pipe 33 for welding to the latter. In this illustration a welder's square 34 has one leg 35 clamped to the protractor body 2 and its other leg 36 supported on the pipe 33 parallel to its longitudinal axis. A second square 39 has one leg 37 clamped to the body 1 and its second leg 38 is engagement with the face of the fitting 32. The bodies 1 and 2 are adjusted about the axis 3 until the legs 35 and 37 are normal to each other. When the fitting 32 and the pipe 33 are oriented as shown, their axes will be coincidental and the face of the fitting will be perpendicular to the axis of the pipe.

In other uses of the apparatus the two bodies 1 and 2 may be arranged so that their respective limbs 4 and 22 may occupy any selected position of angular adjustment between 0° and 180°. Inasmuch as the ledges 7 and 24 are on opposite sides of the respective limbs, the bodies may be rotated freely about the axis 3 without interference between the squares.

The disclosed embodiment is representative of a presently preferred form of the invention, but is intended to be illustrative rather than definitive thereof. The invention is defined in the claims.

I claim:

1. A protractor for use with a welder's square or the like comprising a first body having along a linear side edge thereof a reduced thickness portion extending from said side edge inwardly of said body to form a planar ledge terminating inwardly of said side edge in a linear abutment parallel to said side edge; a second body in overlying relation with said first body and having along a linear side edge thereof a reduced thickness portion extending from said side edge of said second body inwardly thereof to form a second planar ledge terminating inwardly of said side edge of said second body in a second linear abutment parallel to said side edge of said second body, each of said ledges forming a flat seat for the removable accommodation of a leg of such square, said seats lying in parallel, spaced planes; clamp means carried by each of said bodies for forcibly urging against the abutment of the associated body a leg of such square seated on the ledge of the associated body; means coupling said bodies for relative rotation about an axis; and indicia carried by said bodies for indicating the relative angular positions thereof.

2. A protractor according to claim 1 wherein each of said abutments has a height above the associated ledge corresponding substantially to the thickness of the leg of the associated square.

3. A protractor according to claim 1 wherein each of said ledges has a width less than that of the leg of the associated square.

4. A protractor according to claim 1 including means carried by one of said bodies and engageable with the other thereof for releasably locking said bodies in a selected position of relative angular adjustment.

5. A protractor according to claim 1 wherein each of said clamping means has an opening for the slideable accommodation of the leg of the associated square, and adjustable bearing means movable toward and away from the associated abutment into and out of engagement with the leg of the associated square.

6. A protractor according to claim 1 wherein said bodies are in face-to-face confrontation and the ledge of the respective bodies are in the outwardly facing surfaces thereof.

7. A protractor according to claim 1 wherein said abutments are coextensive in length with said side edges of the respective bodies.

* * * * *

UNITED STATES PATENT AND TRADEMARK OFFICE
CERTIFICATE OF CORRECTION

PATENT NO. : 4,497,119

DATED : February 5, 1985

INVENTOR(S) : Timothy C. Dearman

It is certified that error appears in the above–identified patent and that said Letters Patent are hereby corrected as shown below:

Column 1, line 31, change "member" to -- members --.

Column 1, line 31, change "on" to -- one --.

Column 3, line 13, change "is" to -- in --.

Column 4, line 32, change "ledge" to -- ledges --.

Signed and Sealed this

Twenty-fifth Day of June 1985

[SEAL]

Attest:

DONALD J. QUIGG

*Attesting Officer*     *Acting Commissioner of Patents and Trademarks*